US011193041B1

(12) United States Patent
Glover et al.

(10) Patent No.: US 11,193,041 B1
(45) Date of Patent: Dec. 7, 2021

(54) POLYURETHANE MOISTURE BARRIER COATINGS CONTAINING THERMOPLASTIC RESINS

(71) Applicant: Surface Chemists of Florida, Inc., Jupiter, FL (US)

(72) Inventors: A. Jaeton Glover, Jupiter, FL (US); Alice P. Hudson, Jupiter, FL (US); Stefan J. Kelly, Palm Beach Gardens, FL (US); Russell Klare, Jupiter, FL (US); Cynthia Moss, Jupiter, FL (US); Matthew Taylor, Palm Beach Gardens, FL (US)

(73) Assignee: SURFACE CHEMISTS OF FLORIDA, INC., Jupiter, FL (US)

( * ) Notice: Subject to any disclaimer, the term of this patent is extended or adjusted under 35 U.S.C. 154(b) by 0 days.

(21) Appl. No.: 16/897,019

(22) Filed: Jun. 9, 2020

(51) Int. Cl.
| | |
|---|---|
| *C09D 175/08* | (2006.01) |
| *C09D 193/04* | (2006.01) |
| *C08G 18/10* | (2006.01) |
| *C05C 9/00* | (2006.01) |
| *C09D 193/00* | (2006.01) |
| *C08G 18/76* | (2006.01) |
| *C08G 18/48* | (2006.01) |
| *C08G 18/08* | (2006.01) |
| *C05G 5/30* | (2020.01) |
| *C05G 5/12* | (2020.01) |
| *C05G 3/40* | (2020.01) |
| *C08G 18/44* | (2006.01) |
| *C05D 1/00* | (2006.01) |
| *C05C 1/00* | (2006.01) |
| *C05B 7/00* | (2006.01) |
| *C05C 11/00* | (2006.01) |
| *C05B 17/00* | (2006.01) |

(52) U.S. Cl.
CPC .............. *C09D 175/08* (2013.01); *C05B 7/00* (2013.01); *C05B 17/00* (2013.01); *C05C 1/00* (2013.01); *C05C 9/005* (2013.01); *C05C 11/00* (2013.01); *C05D 1/00* (2013.01); *C05G 3/40* (2020.02); *C05G 5/12* (2020.02); *C05G 5/37* (2020.02); *C08G 18/0871* (2013.01); *C08G 18/10* (2013.01); *C08G 18/44* (2013.01); *C08G 18/48* (2013.01); *C08G 18/7657* (2013.01); *C09D 193/00* (2013.01); *C09D 193/04* (2013.01)

(58) Field of Classification Search
None
See application file for complete search history.

(56) References Cited

U.S. PATENT DOCUMENTS

| | | | |
|---|---|---|---|
| 3,223,518 A | 12/1965 | Hansen | |
| 3,252,786 A | 5/1966 | Bozzelli | |
| 3,264,088 A | 8/1966 | Hansen | |
| 3,280,215 A | 10/1966 | Severance | |
| 4,003,959 A | 1/1977 | Wada et al. | |
| 4,011,061 A | 3/1977 | Forseen et al. | |
| 4,082,533 A | 4/1978 | Wittenbrook et al. | |
| 4,089,800 A | 5/1978 | Temple | |
| 4,189,548 A | 2/1980 | Sakashita et al. | |
| 4,210,733 A | 7/1980 | Hayashi et al. | |
| 4,311,250 A * | 1/1982 | Ravve | B65D 81/24 220/458 |
| 4,749,434 A | 6/1988 | Harrison | |
| 4,969,947 A * | 11/1990 | Moore | C05C 9/00 71/28 |
| 5,137,563 A | 8/1992 | Valkanas | |
| 5,300,135 A | 4/1994 | Hudson et al. | |
| 5,423,897 A | 6/1995 | Hudson et al. | |
| 5,476,528 A | 12/1995 | Trimm et al. | |
| 5,478,375 A | 12/1995 | Hudson | |
| 5,538,531 A | 7/1996 | Hudson et al. | |
| 5,698,002 A | 12/1997 | Hudson | |
| 5,739,184 A | 4/1998 | Marbry et al. | |
| 5,803,946 A | 9/1998 | Petcavich et al. | |
| 5,858,094 A | 1/1999 | Detrick et al. | |
| 5,984,994 A | 11/1999 | Hudson | |
| 6,231,633 B1 | 5/2001 | Hirano | |
| 6,663,686 B1 | 12/2003 | Geiger et al. | |
| 7,018,440 B2 | 3/2006 | Tabei | |
| 7,682,656 B2 | 3/2010 | Xing | |
| 8,303,680 B2 | 11/2012 | Mente | |
| 8,795,406 B2 | 8/2014 | Maruvada et al. | |
| 8,888,887 B2 | 11/2014 | Hargrove et al. | |
| 10,189,752 B2 | 1/2019 | Achille et al. | |
| 2003/0157247 A1 | 8/2003 | Chikami | |
| 2006/0115586 A1 | 6/2006 | Xing | |

(Continued)

FOREIGN PATENT DOCUMENTS

WO 2007022031 2/2007

OTHER PUBLICATIONS

LH. Sperling: "Interpenetrating Polymer Networks: An Overview", American Chemical Society, May 5, 1994.

(Continued)

*Primary Examiner* — Wayne A Langel

(74) *Attorney, Agent, or Firm* — Fox Rothschild LLP

(57) ABSTRACT

A moisture barrier coating includes the reaction product of (A) at least one polyol and (B) at least one polyisocyanate. The moisture barrier coating further includes at least one amorphous thermoplastic material that forms a homogeneous mixture with the polyol, and is nonreactive with the polyol and with the polyisocyanate. A controlled release fertilizer, a method for the production of a controlled release fertilizer, and a moisture barrier coating composition are also disclosed.

17 Claims, No Drawings

(56) References Cited

U.S. PATENT DOCUMENTS

| | | | |
|---|---|---|---|
| 2009/0020038 A1 | 1/2009 | Fenn et al. | |
| 2009/0020041 A1 | 1/2009 | Fenn | |
| 2010/0239846 A1* | 9/2010 | Tsubota | C08G 18/44 |
| | | | 428/318.6 |
| 2010/0307211 A1 | 12/2010 | Xing et al. | |
| 2013/0042659 A1* | 2/2013 | Beatty | C05C 9/005 |
| | | | 71/64.02 |
| 2014/0033779 A1 | 2/2014 | Bertin | |
| 2014/0220315 A1* | 8/2014 | Zhang | C09D 11/101 |
| | | | 428/200 |
| 2015/0376077 A1 | 12/2015 | Barr | |
| 2016/0002378 A1* | 1/2016 | Shimizu | C08F 220/10 |
| | | | 525/330.3 |
| 2016/0160064 A1* | 6/2016 | Burns | C09D 11/101 |
| | | | 428/195.1 |
| 2016/0297725 A1 | 10/2016 | No et al. | |
| 2018/0022661 A1* | 1/2018 | Achille | C09D 175/08 |
| | | | 71/27 |
| 2018/0371270 A1* | 12/2018 | Graunke | C09J 133/14 |
| 2019/0031892 A1* | 1/2019 | Bender | C09D 5/185 |
| 2019/0256436 A1* | 8/2019 | Rosenthal | C05C 3/005 |

OTHER PUBLICATIONS

W.J. Work et al.: "Definition of terms related to polymer blends, composites, and multiphase polymeric materials (IUPAC Recommendations 2004)", Pure and Applied Chemistry, vol. 76, No. 11, pp. 1985-2007, 2004.

* cited by examiner

POLYURETHANE MOISTURE BARRIER COATINGS CONTAINING THERMOPLASTIC RESINS

FIELD OF THE INVENTION

This invention relates to moisture barrier coatings for applications including controlled release fertilizers.

BACKGROUND OF THE INVENTION

U.S. Pat. No. 10,189,752 to Achille, et al, discloses the addition of a mixture of an organic wax and a wax soluble polymer to one or more components of a thermoset polymer, which may form a semi-interpenetrating polymer network when the thermoset polymer is subsequently cured on the surface of a substrate, and substantially improves the moisture barrier properties of the thermoset polymer. The wax is necessary to the performance and the wax soluble polymers may or may not be soluble in a thermoset polymer component.

Polyurethanes have been widely used to manufacture controlled release fertilizers. Patents to these compositions are numerous.

U.S. Pat. No. 5,538,531 to Hudson, et al, discloses polyurethane fertilizer coatings that include an alkyl moiety in the polyol component, and requires the addition of a wax sealant.

U.S. Pat. No. 6,663,686 to Geiger, et al discloses a controlled release fertilizer comprising a particulate plant nutrient surrounded by a coating which is the reaction product of a mixture comprising a polyol, an isocyanate and an organic wax.

U.S. Pat. No. 3,475,154 to Kato discloses the use of thermoplastic and thermoset resins, applied separately. In Kato's Example 1, a polyurethane coated fertilizer is overcoated with particles of a polyester resin, followed by molten paraffin.

Hydrocarbon resins are known to be included in polyurethanes, commonly for applications as adhesives.

For example, U.S. Pat. No. 3,743,616, to Kest, discloses compositions for pressure sensitive adhesives that comprise polymers of telechelic diene resins with reactive groups, and coreactive components that can have functionalities including isocyanates. Nonreactive tackifying resins can be included in the compositions.

There is a continuing need for improvement in the nutrient use efficiency of fertilizers, to prevent environmental damage from nutrient run-off and to maximize the economic benefits of the fertilizer application. Controlling the release rate of the nutrients to adapt to the requirements of the landscape, agricultural, and horticultural targets to which the fertilizers are applied is a critical requirement for this. Thus continued improvement in the performance of controlled release fertilizers is needed.

SUMMARY OF THE INVENTION

A moisture barrier coating comprising the reaction product of:
  A. at least one polyol
  B. at least one polyisocyanate
  and further comprising at least one amorphous thermoplastic material that forms a homogeneous mixture with the polyol, and is nonreactive with the polyol and with the polyisocyanate.

It has been found that the addition of certain amorphous thermoplastic materials herein disclosed that form homogeneous mixtures with the polyol reactant and are nonreactive with the polyol and polyisocyanate polyurethane thermoset resin components improves the performance properties of the polyurethane coating in applications including controlled release fertilizers.

DESCRIPTION OF THE PREFERRED EMBODIMENTS

In one aspect of the invention the thermoset polymer is a polyurethane comprised of the reaction product of an isocyanate reactive polyol and a polyisocyanate.

The choice of isocyanate reactive polyol is not particularly restricted and one skilled in the art will recognize suitable polyols. Non-limiting examples include hydroxy terminated polymers selected from the group comprising polyethers, polyesters, polycarbonates, polydienes, and polycaprolactones. Other suitable polyols are derived from vegetable oil glycerides. Additional suitable polyols are castor oil and hydrogenated castor oil. Polyols derived from cashew nutshell liquid are also suitable.

Suitable polyether polyols have about 2 to about 3 terminal hydroxyl groups, with molecular weights from about 400 to about 4000. These polyols are sold for example by BASF (Ludwigshafen, DE) as Pluracol® polyols, and by Monument Chemical (Indianapolis, Ind.) as Poly G® polyols.

Suitable polyester polyols are available from for example Stepan Company (Northfield, Ill.) under the trade name Stepanpol®, and from Emery Oleochemicals (Cincinnati, Ohio) under the trade name Emerox®.

Suitable polycarbonate polyols are available from for example UBE (San Francisco, Calif.) under the trade name Eternacoll®, from Perstorp Polyols (Toledo, Ohio) under the trade name Oxymer®, and from Covestro (Dormagen, DE) under the trade name Desmophen® C.

Suitable polycaprolactone polyols are available from for example Daicel Corporation (Tokyo, JP) sold under the trade name Placcel®, and from Ingevity (North Charleston, S.C.) sold under the trade name Capa®.

Polyols derived from vegetable oil glycerides that are suitable for this application include for example polyols available from Cargill Incorporated (Minneapolis, Minn.) sold under the trade names Agrol® and BiOH®, and polyols available from Emery Oleochemicals LLC (Cincinnati, Ohio) sold under the trade name Emerox®.

Castor oil is a naturally occurring polyol and the oil itself and certain modifications thereof are highly suitable in this application. Suitable grades of castor oil and castor oil derivatives are available from Vertellus LLC (Indianapolis, Ind.).

Polyols derived from cashew nut oil are also suitable in this invention. Suitable cashew nut oil derived polyols are available from Cardolite Corporation (Newark, N.J.) and sold under the trade name Cardolite®.

Hydroxy functional polydienes are also suitable in this invention. Examples are hydroxy functional polybutadienes which are available from Cray Valley (Exton, Pa.) and are sold under the trade names Poly Bd® and Krasol®, and from Evonik Corporation (Parsippany, N.J.) and are sold under the trade name Polyvest® HT.

Mixtures of polyols are also be suitable and may be used.

The choice of polyisocyanate is not particularly restricted and one skilled in the art will recognize suitable polyisocyanates. Suitable commercially available polyisocyanates include toluene diisocyanate sold as Mondur® TD, TDS, and TD-80 by Mobay Corporation (Pittsburgh, Pa.), as Vonanite® T-80 by Dow Chemical Company (Midland, Mich.), and as Lupranate® TDI by BASF Corp. Pure and modified diphenylmethylene diisocyanates are sold as Mondur® M by Mobay Corporation, and as Isonate® 125M, 143L, 181 and 2240 by Dow Chemical Company. Polymeric diphenylmethane diisocyanates are sold as PAPI® 27, 94, 135 and 901 by Dow Chemical Company, as Mondur® MR and MRS by Mobay Corporation, and as Lupranate® M10 and M20 by BASF Corp. Suitable polyisocyanates may contain a polyurethane segment, commonly known as a prepolymer. Preferred polyisocyanates are polymeric diphenylmethane diisocyanates.

In addition to the polyol and polyisocyanate components of the thermoset polymer described above, the reaction product and/or polyurethane may further comprise one or more additives. The one or more additives are chosen from catalysts, fillers, stabilizers, cross-linking agents, chain-extending agents, chain-terminating agents, air releasing agents, wetting agents, surface modifiers, moisture scavengers, desiccants, viscosity reducers, reinforcing agents, colorants, anti-oxidants, ultraviolet light stabilizers, thixotropic agents, anti-aging agents, lubricants, coupling agents, solvents, rheology promoters, thickeners, anti-static agents, and combinations thereof. The one or more additives may be utilized in the polyurethane in various amounts. It is to be appreciated that the one or more additives may include any combination of the aforementioned options if included.

The amorphous thermoplastic additives suitable in this invention are materials that 1) form a homogeneous mixture with at least one polyol component at ≤120° C., and 2) are nonreactive with the polyol and the isocyanate components used to produce the thermoset polyurethane.

Nonreactive thermoplastic additives are additives that when employed in the compositions of this invention do not react sufficiently with the urethane reactive components to affect the curing reaction of the polyurethane or the properties of the polyurethane polymer. Thus any reactive functionality that is present in the chemical structure of the thermoplastic materials of this invention will potentially react with less than about 5 percent of the reactive groups on either the polyisocyanate reactant or the polyol reactant, under the conditions of the processes of the invention. The nonreactive thermoplastic materials can react with 0, 0.5, 1, 1.5, 2, 2.5, 3, 3.5, 4, 4.5 or 5 percent of the reactive groups on either the polyisocyanate or polyol reactants, or within a range of any high value and low value selected from these values.

Suitable thermoplastic additives may be materials that are typically components of adhesives, to which they may provide improved adhesion, and may also provide improved moisture barrier properties.

In one aspect of the invention the thermoplastic additives are the materials typically sold as tackifiers.

Tackifiers are amorphous, low-molecular weight oligomers that are added to adhesive formulations to improve tack and peel adhesion. Their glass transition temperature ($T_g$) may be higher than that of the base polymer but their molecular weight is much lower. The tackifiers disperse in the polymer matrix and break up their structure and thereby enhance the mobility and tack of the base polymer. They may also provide functionality that promotes specific adhesion.

The three most common groups of tackifiers are hydrocarbon resins, rosin esters, and polyterpenes.

Hydrocarbon resins are amorphous thermoplastic polymers produced by polymerization of unsaturated hydrocarbons. The feedstock may be various by-products of naphtha crackers. These resins have typically a low molecular weight ranging from about 400 to 5000 g/mol. The three main types are resins polymerized from C5 monomers, resins polymerized from C9 aromatic monomers and resins polymerized from dicyclopentadiene (DCPD) cycloaliphatic monomers. Copolymers of these monomers are also commonly available. They may be hydrogenated to reduce discoloration and to improve their heat and UV stability.

C5 monomers include but are not limited to cis/trans 1,3-pentadienes, 2-methyl-2-butene, cyclopentene, and cyclopentadiene. Suitable commercially available C5 aliphatic resins that may be polymers and copolymers of C5 aliphatic monomers and other hydrocarbon monomers include, for example, resins available from Cray Valley (Exton, Pa.) sold as Wingtack®, resins available from Rezkem (Hudson, Ohio) sold as Alphatac®, resins available from Neville Chemical Company (Pittsburgh, Pa.) sold as Nevpene®, resins available from ExxonMobil (Irving, Tex.), sold as Escorez®, and resins available from Eastman Chemical Company (Kingsport, Tenn.), sold as Piccotac®.

C9 aromatic monomers include but are not limited to indene, methylindenes, styrene, alpha-methylstyrene and various vinyl toluenes. Suitable commercially available C9 resins that may be polymers and copolymers of C9 monomers and other hydrocarbon monomers include, for example, resins available from Rezkem sold as Arotac®, resins available from Neville sold as NP-10®, and NP-25®, Nevpene® and Nevex®, resins available from ExxonMobil sold as Escorez®, resins available from Kraton (Houston, Tex.) sold as Sylvares®, and resins available from Eastman, sold as Kristalex®, Picco®, and Piccotex®.

Dicyclopentadiene homopolymer and copolymer resins are available, for example, from Eastman as Regalite® resins, and from Rezkem as Alphatac® resins.

Rosin, also called rosin acid, is a natural occurring resin derived from pine and spruce trees. Unlike hydrocarbon resins, rosin is not a polymer but a complex mixture of high molecular weight acidic molecules including abietic and pimaric type acids. The three most important types are gum rosin, wood rosin, and tall oil rosin. Gum rosin is the exudate of plants and trees. Commercial gum rosin is harvested from pine trees by periodically wounding the tree and collecting the sap. Wood rosin is harvested from the stump of pine trees by multiple extraction and distillation. Tall oil rosin is a by-product of the Kraft process of wood pulp manufacture when pulping pine trees, and when distilled has properties similar to wood and gum rosin.

To improve their oxidative stability they are often treated by disproportionation and hydrogenation. To improve compatibility in their applications they are typically converted to esters. Important esters include glycerol, methyl triethylene glycol, and pentaerythritol esters. Commercially available rosin based products include for example products available from Eastman Chemical Company (Kingsport, Tenn.) and sold under the trade names Abitol®, Dymerex®, Foral®, Foralyn®, Pentalyn®, Permalyn®, Poly-Pale®, and Staybelite®; products available from Teckrez (Jacksonville, Fla.) and sold under the trade name Teckroz®; products available from Ingevity (North Charleston, S.C.) sold under the trade names Altatac® and WestRez®, and products available from Kraton sold under the trade names Sylvatac® and Sylvalite®. Tall oil pitch, which is the residue from the distillation of tall oil and contains primarily high-boiling esters of fatty acids and rosin, and may also contain neutral materials, free fatty acids and rosin acids is also suitable. It is available for example from Ingevity.

Polyterpenes are polymers based on naturally occurring terpene chemistries, of which commercially important products include products based on α-pinene, β-pinene, and d-limonene. For commercial resin applications, terpenes are usually further modified or polymerized. The three most important types of commercial terpene resins are pinene-based polyterpene and styrene- and phenol-modified polyterpene. Commercially available polyterpenes and modified polyterpenes include but are not limited to products available from Kraton and sold under the trade name Sylvares® and products available from Ingevity and sold under the trade name Altastick®.

The moisture barrier coatings of this invention may be applied to any substrate where such a coating may be beneficial. In one aspect of this invention the coatings are applied to commercial particulate fertilizer particles to provide a controlled release benefit.

Commercial particulate fertilizers are produced and marketed in several different particle types, e.g., granular, pelletized, and prilled fertilizers. Also they may be formed of inorganic substances, organic substances, or combinations thereof. The moisture barrier coatings of this invention can be applied to any of these. To be effective in promoting plant growth, fertilizers must contain some amount of water soluble plant nutrients, typically in the form of water soluble compounds of nitrogen, phosphorus and potassium, alone or in combination and often in conjunction with other elements, e.g., calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated 6-6-6, 4-6-4, 10-10-10, 20-20-5, 14-16-0, 5-20-20, and the like. In addition, specialized fertilizers may contain optional additives such as herbicides, insecticides, trace elements, iron salts, etc. The coatings of this invention can be applied to any of these.

The mixtures of amorphous thermoplastic materials and the polyol component are prepared by mixing the components with heating and agitation sufficient to produce homogeneous mixtures. Typically the mixtures are heated to a temperature at which the viscosity of the thermoplastic materials is reduced sufficiently to allow mixing with the polyol component. The thermoplastic materials are chosen to form homogeneous mixtures in the polyol reactant and to be nonreactive with the polyol and with the polyisocyanate polyurethane thermoset resin components at temperatures below about 80° C. and preferably below about 120° C.

In one mode of carrying out the invention the thermoplastic material is dispersed into a polyol, forming a homogeneous mixture. Fertilizer particles are preheated typically to about 50 to 90° C., in a mixing device that provides thorough, low shear agitation. The temperature is chosen based on factors including the heat stability of the fertilizer to be coated, the temperature dependent flow characteristics of the polyol-thermoplastic material mixture, and of the polyisocyanate, and the temperature dependence of the reaction rate of the polyol with the polyisocyanate. One skilled in the art will choose a temperature that allows the components to spread and mix on the fertilizer particles, and also allows the reaction to proceed at a rate conducive to both complete mixing and spreading of the components before the viscosity increase from the reaction prevents further mixing and spreading, and considers the requirements for economical production rates. The mixture of the polyol and thermoplastic material is applied to the fertilizer granules and the mixing action facilitates spreading the mixture uniformly onto the granules. When a uniform distribution is achieved, a polyisocyanate component is added such that the ratio of OH functionality on the polyol and the isocyanate moieties of the polyisocyanate is between about 0.5 to 1 and about 1 to 1, and is preferably between about 0.7 to 1 and about 1 to 1. The polyisocyanate is allowed to spread and mix and react with the mixture of polyol and thermoplastic material, forming a polyurethane that incorporates the thermoplastic material into the thermoset polyurethane polymer. The addition of the mixture of polyol and thermoplastic material and the polyisocyanate may be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of, for example, flakes or prills. The use of wax sealants on variously coated fertilizers is well known in the art. The sealants typically comprise petroleum waxes, synthetic waxes, natural waxes, and mixtures of waxes with various wax soluble additives. Suitable wax compositions are described in for example U.S. Pat. Nos. 5,300,135, 5,423,897, 5,478,375, and 5,984,994, incorporated herein by reference.

In another mode of carrying out the invention the thermoplastic material is dispersed into a polyol, forming a homogeneous mixture. Fertilizer particles are preheated typically to about 50 to 90° C., in a mixing device that provides thorough, low shear agitation. The polyisocyanate component is applied to the fertilizer particles and allowed to spread on the surface of the particles. When a uniform distribution is achieved the mixture of thermoplastic material dispersed into the polyol component is added such that the ratio of OH functionality on the polyol and the isocyanate moieties is between about 0.5 to 1 and about 1 to 1, and is preferably between about 0.7 to 1 and about 1 to 1. The polyol mixture is allowed to spread and mix and react with the polyisocyanate, forming a polyurethane that incorporates the thermoplastic material into the thermoset polyurethane polymer. The addition of the polyisocyanate and polyol-thermoplastic material mixture may be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills.

In still another mode of carrying out the invention, the thermoplastic material is dispersed into a polyol, forming a homogeneous mixture. Fertilizer particles are preheated typically to about 50 to 90° C., in a mixing device that provides thorough, low shear agitation. The mixture of thermoplastic material and polyol, and polyisocyanate component are applied simultaneously in separate streams to the fertilizer particles such that the ratio of OH functionality on the polyol and the isocyanate moieties is between about 0.5 to 1 and about 1 to 1, and is preferably between about 0.7 to 1 and about 1 to 1. The mixture is allowed to spread and react on the surface of the particles, forming a polyurethane that incorporates the thermoplastic material into the thermoset polyurethane polymer. The addition of the polyisocyanate and polyol-thermoplastic material mixture can be repeated until the desired coating weight and controlled release properties are achieved. Typically each coating layer is from about 0.5 percent to about 2 percent by weight of the fertilizer particles and the total coating weight is from about 1 percent to about 10 percent by weight of the fertilizer particles. The coated fertilizer particles are cooled to ambient temperature preferably with gentle agitation. Alternatively a wax based sealant may be applied to the particles prior to the cooling step by adding the sealant as a molten liquid or as small particles in the form of for example flakes or prills.

The level of thermoplastic material added as a weight percent of the polyurethane coating composition is chosen based on considering the viscosity of the mixtures of the material with the polyol, the dependence of the performance of the moisture barrier coating material on the addition level, and the limits of the compatibility of the thermoplastic material in the cured polyurethane polymer. The weight ratio of the thermoplastic material to the polyurethane polymer can be 70:30, 69:31, 68:32, 67:33, 66:34, 65:35, 64:36, 63:37, 62:38, 61:39, 60:40, 59:41, 58:42, 57:43, 56:44, 55:45, 54:46, 53:47, 52:48, 51:49, 50:50, 49:51, 48:52, 47:53, 46:54, 45:55, 44:56, 43:57, 42:58, 41:59, 40:60, 39:61, 38:62, 37:63, 36:64, 35:65, 34:66, 33:67, 32:68, 31:69, 30:70, 29:71, 28:72, 27:73, 26:74, 25:75, 24:76, 23:77, 22:78, 21:79, 20:80, 19:81, 18:82, 17:83, 16:84, 15:85, 14:86, 13:87, 12:88, 11:89, 10:90, 9:91, 8:92, 7:93, 6:94, 5:95, 4:96, 3:97, 2:98, or 1:99, or within a range of any high and low ratio of these values.

Preferably the thermoplastic material is from about 2 percent to about 50 percent of the polyurethane coating composition containing the thermoplastic, and most preferably from about 5 percent to about 30 percent of the polyurethane coating composition containing the thermoplastic material.

Without being bound by theory, the compositions of the cured polyurethane polymers containing the thermoplastic material produced by the methods described above can be described as polymer blends as defined in *Pure Appl. Chem.*, Vol. 76, No. 11, pp. 1985-2007, 2004. Thus they exhibit macroscopically uniform physical properties throughout their volume. The thermoplastic material and polyurethane polymer may or may not be miscible and the macroscopically uniform physical properties are typically caused by sufficiently strong interactions between the component polymers.

The suitability of the available thermoplastic materials for the compositions of this invention can be determined by the following methods:

To determine whether the thermoplastic materials form homogeneous mixtures with the polyol the following method may be used:

1. To a 150 ml beaker charge 50 g of the polyol. Place the beaker on a hot plate and stir with an overhead mixer while monitoring the temperature of the beaker contents.

2. When the target temperature is reached add the targeted amount of the thermoplastic material and stir, maintaining the temperature, until the material has melted and dispersed into the polyol.

3. Discontinue stirring and continue to hold the mixture at the target temperature while observing the physical behavior. Note whether 1) the mixture is a clear solution, or 2) the mixture is a homogeneous dispersion that remains stable, or 3) the mixture forms two phases on standing.

4. Cool the mixture to ambient temperature and observe the physical form, as in step 3.

To determine whether materials that were found to form homogeneous mixtures with the polyol will form a polymer blend on curing the polyol with the polyisocyanate reactant in the application the following method may be used:

1. A quantity of the polyol mixed with the thermoplastic material that was formed by the mixing procedure described above sufficient to form 10 g of cured material is charged to a 2 inch diameter aluminum dish at ambient temperature.

2. A quantity of the polyisocyanate sufficient to form the desired reaction mixture is added, and the components are thoroughly mixed at ambient temperature.

3. The aluminum dish with the mixture is placed in an oven at 80° C. for 1 hour to cure. It is removed from the oven and allowed to cool to ambient temperature.

4. The cured polymer containing the thermoplastic material is observed to determine whether the thermoplastic material has formed a macroscopically uniform composition with the polyurethane polymer, or has formed a physically separated phase from the cured polyurethane polymer.

To determine the controlled release properties of the coated urea products, the following method may be used:

10 g of the coated products are dispersed in 90 g of water and stored at 38° C. At selected intervals the mixture is gently stirred, and the urea that has released from the granules is determined by quantifying the urea in the water phase by measuring the refractive index, which is linear with the urea concentration in the solution.

The following examples further illustrate the invention. As used herein all parts or percentages are by weight of the entire composition unless otherwise indicated.

In the examples the following materials are used:

| Reagent | Description | Company | Location |
|---|---|---|---|
| Wingtack ® 10 | Aliphatic tackifying resin | TOTAL Cray Valley | Exton, PA |
| Arotac ® 100MA | Aliphatic-modified aromatic tackifying resin | Rezkem Chemicals, LLC | Hudson, OH |
| Tallex ® | Tall oil pitch | Ingevity | N. Charleston, SC |
| Sylvatac ® RE 98 | Rosin ester tackifier, pentaerythritol ester | Kraton Chemical, LLC | Houston, TX |
| Sylvalite ® RE 85GB | Rosin ester tackifier, glycerol ester | Kraton Chemical, LLC | Houston, TX |
| Sylvalite ® 2038 | Rosin ester tackifier, mixed ester | Kraton Chemical, LLC | Houston, TX |
| Uni-tac ® 70 | Modified rosin tackifier, formaldehyde modified | Kraton Chemical, LLC | Houston, TX |

-continued

| Reagent | Description | Company | Location |
| --- | --- | --- | --- |
| Sylvares ® TR A25L | Polyterpene tackifying resin, alpha-pinene based | Kraton Chemical, LLC | Houston, TX |
| Sylvares ® TP 96 | Terpene phenolic resin | Kraton Chemical, LLC | Houston, TX |
| CARPOL ® PGP-400 | Polyether polyol | Carpenter Co. | Richmond, VA |
| Dry #1 Castor Oil | Castor oil, dried | Vertellus Performance Materials Inc. | Greensboro, NC |
| Lupranate ® M20 | Polymeric MDI | BASF Corporation | Florham Park, NJ |
| AlphaPlus ® C30+ | Alpha olefin wax | Chevron Phillips Chemical Company | The Woodlands, TX |

EXAMPLES

Example 1

18.20 g of CARPOL® PGP-400 and 1.79 g of Arotac® 100MA were combined and vigorously mixed at 80° C. until a clear homogenous mixture formed.

300 g of −6/+10 mesh urea granules were charged to a rotating drum mixer, heated to 75-80° C. and maintained at this temperature. 1.90 g of the CARPOL® PGP-400-Arotac® 100MA mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Arotac® 100MA was 5 percent by weight of the coating.

Example 2

18.20 g of CARPOL® PGP-400 and 1.79 g of Tallex® were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Tallex® mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Tallex® was 5 percent by weight of the coating.

Example 3

18.21 g of CARPOL® PGP-400 and 1.79 g of Sylvatac® RE 98 were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Sylvatac® RE 98 mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

Example 4

18.21 g of CARPOL® PGP-400 and 1.79 g of Sylvalite® RE 85 GB were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Sylvalite® RE 85 GB mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® RE 85 GB was 5 percent by weight of the coating.

Example 5

18.21 g of CARPOL® PGP-400 and 1.80 g of Sylvalite® 2038 were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Sylvalite® 2038 mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 5 percent by weight of the coating.

Example 6

18.21 g of CARPOL® PGP-400 and 1.79 g of Uni-tac® 70 were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Uni-tac® 70 mixture prepared above were added to the urea granules. After agitating for 2 minutes 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Uni-tac® 70 was 5 percent by weight of the coating.

Example 7

18.21 g of CARPOL® PGP-400 and 1.79 g of Sylvares® TP 96 were combined and vigorously mixed at 80° C. until a clear homogenous mixture formed.

300 g of −6/+10 mesh urea granules were charged to a rotating drum mixer, heated to 75-80° C., and maintained at this temperature. 1.90 g of the CARPOL® PGP-400-Sylvares® TP 96 mixture prepared above were added to the urea granules. After agitating for 2 minutes, 1.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvares® TP 96 was 5 percent by weight of the coating.

Example 8 (Comparative)

300 g of −6/+10 mesh urea granules were charged to a rotating drum mixer, heated to 75-80° C., and maintained at this temperature. 1.82 g of CARPOL® PGP-400 were added to the urea granules. After agitating for 2 minutes, 1.58 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea.

To determine the controlled release properties of the coated urea products of Examples 1, 2, 3, 4, 5, 6, 7, and 8, 10 g of the coated urea were dispersed in 90 g of water and stored at 38° C. for 7 days. The urea that had released from the granules was determined by quantifying the urea in the water phase by refractive index. The results are shown in Table 1:

TABLE 1

| Example | Thermoplastic | 7 Day Release |
|---|---|---|
| 1 | 5% Arotac ® 100MA | 83% |
| 2 | 5% Tallex ® | 71% |
| 3 | 5% Sylvatac ® RE 98 | 82% |
| 4 | 5% Sylvalite ® RE 85GB | 74% |
| 5 | 5% Sylvalite ® 2038 | 80% |
| 6 | 5% Uni-tac ® 70 | 88% |
| 7 | 5% Sylvares ® TP 96 | 74% |
| 8 (Comparative) | None | 88% |

Example 9

18.52 g of castor oil and 1.47 g of Wingtack® 10 were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Wingtack® 10 mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Wingtack® 10 was 5 percent by weight of the coating.

Example 10

18.53 g of castor oil and 1.47 g of Arotac® 100MA were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Arotac® 100MA mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea, and the Arotac® 100MA was 5 percent by weight of the coating.

Example 11

18.55 g of castor oil and 1.47 g of Tallex® were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Tallex® mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Tallex® was 5 percent by weight of the coating.

Example 12

18.53 g of castor oil and 1.47 g of Sylvatac® RE 98 were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Sylvatac® RE 98 mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

Example 13

18.53 g of castor oil and 1.47 g of Sylvalite® RE 85 GB were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Sylvalite® RE 85

GB mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea, and the Sylvalite® RE 85 GB was 5 percent by weight of the coating.

Example 14

18.53 g of castor oil and 1.47 g of Sylvalite® 2038 were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Sylvalite® 2038 mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 5 percent by weight of the coating.

Example 15

18.52 g of castor oil and 1.47 g of Uni-tac® 70 were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Uni-tac® 70 mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Uni-tac® 70 was 5 percent by weight of the coating.

Example 16

18.53 g of castor oil and 1.47 g of Sylvares® TR A25L were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Sylvares® TR A25L mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvares® TR A25L was 5 percent by weight of the coating.

Example 17

18.53 g of castor oil and 1.47 g of Sylvares® TP 96 were combined and vigorously mixed at 90-100° C. until a clear homogenous mixture formed.

300 g of −6/+10 mesh urea granules were charged to a rotating drum mixer, heated to 75-80° C., and maintained at this temperature. 2.32 g of the castor oil-Sylvares® TP 96 mixture prepared above were added to the urea granules. After agitating for 2 minutes, 1.09 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvares® TP 96 was 5 percent by weight of the coating.

Example 18 (Comparative)

300 g of −6/+10 mesh urea granules were charged to a rotating drum mixer, heated to 75-80° C., and maintained at this temperature. 2.26 g of castor oil were added to the urea granules. After agitating for 2 minutes, 1.14 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea.

To determine the controlled release properties of the coated urea products of Examples 9, 10, 11, 12, 13, 14, 15, 16, 17 and 18, 10 g of the coated urea were dispersed in 90 g of water and stored at 38° C. for 7 days. The urea that had released from the granules was determined by quantifying the urea in the water phase by refractive index. The results are shown in Table 2:

TABLE 2

| Example | Thermoplastic | 7 Day Release |
| --- | --- | --- |
| 9 | 5% Wingtack ® 10 | 59% |
| 10 | 5% Arotac ® 100MA | 64% |
| 11 | 5% Tallex ® | 64% |
| 12 | 5% Sylvatac ® RE 98 | 70% |
| 13 | 5% Sylvalite ® RE 85GB | 60% |
| 14 | 5% Sylvalite ® 2038 | 66% |
| 15 | 5% Uni-tac ® 70 | 76% |
| 16 | 5% Sylvares ® TR A25L | 72% |
| 17 | 5% Sylvares ® TP 96 | 62% |
| 18 (comparative) | None | 82% |

Example 19

62.95 g of CARPOL® PGP-400 and 13.15 g of Sylvalite® 2038 were combined and vigorously mixed at 80° C. until a clear homogenous mixture formed.

500 g of −6/+10 mesh urea granules were charged to a rotating drum mixer, heated to 75-80° C., and maintained at this temperature. 3.30 g of the CARPOL® PGP-400-Sylvalite® 2038 mixture prepared above were added to the urea granules. After agitating for 2 minutes, 2.37 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 10 percent by weight of the coating.

Example 20

30.10 g of the CARPOL® PGP-400-Sylvalite® 2038 mixture from Example 19 and 6.45 g of Sylvalite® 2038 were combined and vigorously mixed at 90° C. until a clear homogenous mixture formed.

500 g of −6/+10 mesh urea granules were charged to a rotating drum mixer, heated to 75-80° C., and maintained at this temperature. 3.56 g of the CARPOL® PGP-400-Sylvalite® 2038 mixture prepared above were added to the urea granules. After agitating for 2 minutes, 2.11 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 20 percent by weight of the coating.

Example 21

20.06 g of CARPOL® PGP-400 and 37.50 g of Sylvalite® 2038 were combined and vigorously mixed at 90° C. until a clear homogenous mixture formed.

500 g of −6/+10 mesh urea granules were charged to a rotating drum mixer, heated to 75-80° C., and maintained at this temperature. 4.35 g of the CARPOL® PGP-400-Sylvalite® 2038 mixture prepared above were added to the urea granules. After agitating for 2 minutes, 1.32 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 50 percent by weight of the coating.

To determine the controlled release properties of the coated urea products of Examples 5, 19, 20, and 21, 10 g of the coated urea were dispersed in 90 g of water and stored at 38° C. for 7 days. The urea that had released from the granules was determined by quantifying the urea in the water phase by refractive index. The results are shown in Table 3:

TABLE 3

| Example | % Sylvalite ® 2038 | 7 Day Release |
| --- | --- | --- |
| 5 | 5 | 80% |
| 19 | 10 | 74% |
| 20 | 20 | 51% |
| 21 | 50 | 65% |

Example 22

63.65 g of CARPOL® PGP-400 and 13.27 g of Uni-tac® 70 were combined and vigorously mixed at 80° C. until a clear homogenous mixture formed.

61.84 g of CARPOL® PGP-400 and 12.90 g of Sylvares® TP 96 were combined and vigorously mixed at 80° C. until a clear homogenous mixture formed.

5.19 g of the CARPOL® PGP-400-Uni-tac® 70 mixture prepared above, 5.19 g of the CARPOL® PGP-400-Sylvares® TP 96 mixture prepared above, and 9.61 g of CARPOL® PGP-400 were combined and vigorously mixed at 25° C. until a clear homogenous mixture formed.

500 g of −6/+10 mesh urea granules were charged to a rotating drum mixer, heated to 75-80° C., and maintained at this temperature. 3.17 g of the CARPOL® PGP-400-Uni-tac® 70-Sylvares® TP 96 mixture prepared above were added to the urea granules. After agitating for 2 minutes, 2.50 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Uni-tac® 70 and Sylvares® TP 96 were each 2.5 percent by weight of the coating.

To determine the controlled release properties of the coated urea products of Examples 6, 7, and 22, 10 g of the coated urea were dispersed in 90 g of water and stored at 38° C. for 7 days. The urea that had released from the granules was determined by quantifying the urea in the water phase by refractive index. The results are shown in Table 4:

TABLE 4

| Example | % Uni-tac ® 70 | % Sylvares ® TP 96 | 7 Day Release |
| --- | --- | --- | --- |
| 6 | 5 | 0 | 88% |
| 7 | 0 | 5 | 74% |
| 22 | 2.5 | 2.5 | 74% |

Example 23

250 g of the coated urea product from Example 4 were charged into a rotating drum mixer, heated to 80-85° C., and maintained at this temperature. 2.78 g of AlphaPlus® C30+ were added to the urea granules. Agitation was continued for 10 minutes. External heating was removed, and granules were allowed to cool while mixing for 10 minutes at which point the granules were free flowing. The total wax coating was 1 percent by weight of the coated urea.

To determine the controlled release properties of the coated urea products of Examples 4 and 23, 10 g of the coated urea were dispersed in 90 g of water and stored at 38° C. for 7 days. The urea that had released from the granules was determined by quantifying the urea in the water phase by refractive index. The results are shown in Table 5:

TABLE 5

| Example | Thermoplastic | Sealant | 7 Day Release |
| --- | --- | --- | --- |
| 4 | 5% Sylvalite ® RE 85GB | None | 74% |
| 23 | 5% Sylvalite ® RE 85GB | 1% AlphaPlus ® C30+ | 53% |

Example 24

30.96 g of CARPOL® PGP-400 and 3.05 g of Sylvatac® RE 98 were combined and vigorously mixed at 80° C. until a clear homogenous mixture formed.

500 g of −6/+10 mesh urea granules were charged to a rotating drum mixer, heated to 75-80° C., and maintained at this temperature. 2.50 g of Lupranate® M20 were added to the urea granules. After agitating for 2 minutes, 3.17 g of the CARPOL® PGP-400-Sylvatac® RE 98 mixture prepared above were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

Example 25

500 g of −6/+10 mesh urea granules were charged to a rotating drum mixer, heated to 75-80° C., and maintained at this temperature. 3.17 g of the CARPOL® PGP-400-Sylvatac® RE 98 mixture from Example 24 and 2.50 g of Lupranate® M20 were added to the urea granules simultaneously. Agitation was continued for 12 minutes at which point the simultaneous polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

To determine the controlled release properties of the coated urea products of Examples 3, 24, and 25, 10 g of the coated urea were dispersed in 90 g of water and stored at 38° C. for 7 days. The urea that had released from the granules was determined by quantifying the urea in the water phase by refractive index. The results are shown in Table 6:

TABLE 6

| Example | Thermoplastic | Addition Order | 7 Day Release |
| --- | --- | --- | --- |
| 3 | 5% Sylvatac ® RE 98 | Polyol mix first | 82% |
| 24 | 5% Sylvatac ® RE 98 | Isocyanate first | 37% |
| 25 | 5% Sylvatac ® RE 98 | Simultaneous | 54% |

Example 26

60.75 g of castor oil and 10.23 g of Sylvalite® 2038 were combined and vigorously mixed at 90-100° C. until a clear homogenous mixture formed.

500 g of −6/+10 mesh urea granules were charged to a rotating drum mixer, heated to 75-80° C., and maintained at this temperature. 3.96 g of the castor oil-Sylvalite® 2038 mixture prepared above were added to the urea granules. After agitating for 2 minutes, 1.71 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 10 percent by weight of the coating.

Example 27

30.03 g of the castor oil-Sylvalite® 2038 mixture from Example 26 and 5.39 g of Sylvalite® 2038 were combined and vigorously mixed at 100° C. until a clear homogenous mixture formed.

500 g of −6/+10 mesh urea granules were charged to a rotating drum mixer, heated to 75-80° C., and maintained at this temperature. 4.15 g of the castor oil-Sylvalite® 2038 mixture prepared above were added to the urea granules. After agitating for 2 minutes, 1.53 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 20 percent by weight of the coating.

Example 28

25.70 g of the castor oil and 38.69 g of Sylvalite® 2038 were combined and vigorously mixed at 100° C. until a clear homogenous mixture formed.

500 g of −6/+10 mesh urea granules were charged to a rotating drum mixer, heated to 75-80° C., and maintained at this temperature. 4.72 g of the castor oil-Sylvalite® 2038 mixture prepared above were added to the urea granules. After agitating for 2 minutes, 0.95 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvalite® 2038 was 50 percent by weight of the coating.

To determine the controlled release properties of the coated urea products of Examples 14, 26, 27 and 28, 10 g of the coated urea were dispersed in 90 g of water and stored at 38° C. for 7 days. The urea that had released from the granules was determined by quantifying the urea in the water phase by refractive index. The results are shown in Table 7:

TABLE 7

| Example | % Sylvalite ® 2038 | 7 Day Release |
| --- | --- | --- |
| 14 | 5 | 66% |
| 26 | 10 | 70% |
| 27 | 20 | 69% |
| 28 | 50 | 68% |

Example 29

61.66 g of castor oil and 10.35 g of Uni-tac® 70 were combined and vigorously mixed at 90-100° C. until a clear homogenous mixture formed.

64.65 g of castor oil and 10.85 g of Sylvares® TP 96 were combined and vigorously mixed at 90-100° C. until a clear homogenous mixture formed.

5.11 g of the castor oil-Uni-tac® 70 mixture prepared above, 5.11 g of the castor oil-Sylvares® TP 96 mixture prepared above, and 9.80 g of castor oil were combined and vigorously mixed at 25° C. until a clear homogenous mixture formed.

500 g of −6/+10 mesh urea granules were charged to a rotating drum mixer, heated to 75-80° C., and maintained at this temperature. 3.86 g of the castor oil-Uni-tac® 70-Sylvares® TP 96 mixture prepared above were added to the urea granules. After agitating for 2 minutes, 1.81 g of Lupranate® M20 were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Uni-tac® 70 and Sylvares® TP 96 each were 2.5 percent by weight of the coating.

To determine the controlled release properties of the coated urea products of Examples 15, 17, and 29, 10 g of the coated urea were dispersed in 90 g of water and stored at 38° C. for 7 days. The urea that had released from the granules was determined by quantifying the urea in the water phase by refractive index. The results are shown in Table 8:

TABLE 8

| Example | % Uni-tac ® 70 | % Sylvares ® TP 96 | 7 Day Release |
|---|---|---|---|
| 15 | 5 | 0 | 76% |
| 17 | 0 | 5 | 62% |
| 29 | 2.5 | 2.5 | 60% |

Example 30

250 g of the coated urea product from Example 13 were charged into a rotating drum mixer, heated to 80-85° C., and maintained at this temperature. 2.78 g of AlphaPlus® C30+ were added to the urea granules. Agitation was continued for 10 minutes. External heating was removed, and granules were allowed to cool while mixing for 10 minutes. Granules were free flowing. The total wax coating was 1 percent by weight of the coated urea.

To determine the controlled release properties of the coated urea products of Examples 13 and 30, 10 g of the coated urea were dispersed in 90 g of water and stored at 38° C. for 7 days. The urea that had released from the granules was determined by quantifying the urea in the water phase by refractive index. The results are shown in Table 9:

TABLE 9

| Example | Thermoplastic | Sealant | 7 Day Release |
|---|---|---|---|
| 13 | 5% Sylvalite ® RE 85GB | None | 60% |
| 30 | 5% Sylvalite ® RE 85GB | 1% AlphaPlus ® C30+ | 13% |

Example 31

31.49 g of castor oil and 2.50 g of Sylvatac® RE 98 were combined and vigorously mixed at 90-100° C. until a clear homogenous mixture formed.

500 g of −6/+10 mesh urea granules were charged to a rotating drum mixer, heated to 75-80° C., and maintained at this temperature. 1.81 g of Lupranate® M20 were added to the urea granules. After agitating for 2 minutes, 3.86 g of the castor oil-Sylvatac® RE 98 mixture prepared above were added to the urea granules. Agitation was continued for 10 minutes at which point the polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

Example 32

500 g of −6/+10 mesh urea granules were charged to a rotating drum mixer, heated to 75-80° C., and maintained at this temperature. 3.86 g of the castor oil-Sylvatac® RE 98 mixture from Example 31 and 1.81 g of Lupranate® M20 were added to the urea granules simultaneously. Agitation was continued for 12 minutes at which point the simultaneous polymer component additions and agitation were repeated two additional times. The final agitation was continued for an additional 10 minutes until the granules were free flowing. The total coating was 3 percent by weight of the coated urea and the Sylvatac® RE 98 was 5 percent by weight of the coating.

To determine the controlled release properties of the coated urea products of Examples 12, 31, and 32, 10 g of the coated urea were dispersed in 90 g of water and stored at 38° C. for 7 days. The urea that had released from the granules was determined by quantifying the urea in the water phase by refractive index. The results are shown in Table 10:

TABLE 10

| Example | Thermoplastic | Addition Order | 7 Day Release |
|---|---|---|---|
| 12 | 5% Sylvatac ® RE 98 | Polyol mix first | 70% |
| 31 | 5% Sylvatac ® RE 98 | Isocyanate first | 61% |
| 32 | 5% Sylvatac ® RE 98 | Simultaneous | 63% |

The invention can be embodied in other forms without departing from the spirit or essential attributes thereof. Reference should therefore be had to the following claims, rather than to the foregoing specification to determine the scope of the invention.

We claim:

1. A moisture barrier coating comprising the reaction product of:
    A. at least one polyol
    B. at least one polyisocyanate
and further comprising at least one amorphous thermoplastic material that forms a homogeneous mixture with the polyol, is nonreactive with the polyol and with the polyisocyanate, wherein the thermoplastic material comprises hydrocarbon resins having a molecular weight from 400 to 5000 g/mol, and wherein the moisture barrier coating decreases moisture transmission through the coating when compared to moisture transmission through a coating consisting of the reaction product of A. and B.

2. The composition of claim 1 wherein the thermoplastic material is present at from about 2 percent to about 50 percent by weight of the moisture barrier coating.

3. A moisture barrier coating comprising the reaction product of:
    A. at least one polyol
    B. at least one polyisocyanate
and further comprising at least one amorphous thermoplastic rosin based material that forms a homogeneous mixture with the polyol, is nonreactive with the polyol and with the polyisocyanate, and decreases moisture transmission through the coating when compared to moisture transmission through a coating consisting of the reaction product of A. and B.

4. The composition of claim 3, wherein the thermoplastic material is present at from about 2 percent to about 50 percent by weight of the moisture barrier coating.

5. A moisture barrier coating comprising the reaction product of:
    A. at least one polyol
    B. at least one polyisocyanate
and further comprising at least one amorphous thermoplastic polyterpene based material that forms a homogeneous mixture with the polyol, is nonreactive with the polyol and with the polyisocyanate, and decreases moisture transmission through the coating when compared to moisture transmission through a coating consisting of the reaction product of A. and B.

6. The composition of claim 5, wherein the thermoplastic material is present at from about 2 percent to about 50 percent by weight of the moisture barrier coating.

7. A controlled release fertilizer comprising:
A. a central core containing water soluble plant nutrients
B. A moisture barrier coating completely enveloping the central core, comprising the reaction product of:
  i. at least one polyol
  ii. at least one polyisocyanate
and also comprising at least one amorphous thermoplastic material that forms a homogeneous mixture with the polyol, is nonreactive with the polyol and with the polyisocyanate, and decreases moisture transmission through the coating when compared to moisture transmission through a coating consisting of the reaction product of A. and B, said decrease measured by the decrease in the loss of water soluble nutrients from the central core when said controlled release fertilizer is immersed in water; and,
wherein the amorphous thermoplastic material comprises at least one selected from the group consisting of hydrocarbon resin materials having a molecular weight from 400 to 5000 g/mol, rosin based materials, and polyterpene based materials.

8. The composition of claim 7 wherein the moisture barrier coating is present at from about 1 percent to about 10 percent by weight of the controlled release fertilizer.

9. The composition of claim 7 wherein a sealant is present at from about 0.2 percent to about 2 percent by weight of the controlled release fertilizer.

10. The controlled release fertilizer of claim 7 wherein the addition of the amorphous thermoplastic material decreases the release of water soluble plant nutrients by at least about 5 percent by weight.

11. The controlled release fertilizer of claim 7 wherein the addition of the amorphous thermoplastic material decreases the release of water soluble plant nutrients by from about 6 percent to about 42 percent by weight.

12. The controlled release fertilizer of claim 7 wherein the water soluble plant nutrients comprise water soluble compounds of nitrogen, phosphorus and potassium.

13. The controlled release fertilizer of claim 7 wherein the water soluble plant nutrients comprise urea.

14. The composition of claim 7 wherein the amorphous thermoplastic material comprises from about 2 percent to about 50 percent by weight of the moisture barrier coating.

15. A moisture barrier coating system comprising:
A. at least one polyol
B. at least one polyisocyanate
and further comprising at least one amorphous thermoplastic material that forms a homogeneous mixture with the polyol, is nonreactive with the polyol and with the polyisocyanate, wherein the thermoplastic material comprises hydrocarbon resins having a molecular weight from 400 to 5000 g/mol, and wherein the moisture barrier coating decreases moisture transmission through the coating when compared to moisture transmission through a coating consisting of the reaction product of A. and B.

16. A moisture barrier coating system comprising:
A. at least one polyol
B. at least one polyisocyanate
and further comprising at least one amorphous thermoplastic rosin based material that forms a homogeneous mixture with the polyol, is nonreactive with the polyol and with the polyisocyanate, and decreases moisture transmission through the coating when compared to moisture transmission through a coating consisting of the reaction product of A. and B.

17. A moisture barrier coating system comprising:
A. at least one polyol
B. at least one polyisocyanate
and further comprising at least one amorphous thermoplastic polyterpene based material that forms a homogeneous mixture with the polyol, is nonreactive with the polyol and with the polyisocyanate, and decreases moisture transmission through the coating when compared to moisture transmission through a coating consisting of the reaction product of A. and B.

* * * * *